United States Patent
Leoka et al.

(10) Patent No.: US 10,464,539 B2
(45) Date of Patent: Nov. 5, 2019

(54) SYSTEM FOR REDUCING THE BRAKE WEAR OF HEAVY VEHICLES, IN PARTICULAR FOR PUBLIC TRANSPORTATION OR FOR GARBAGE COLLECTION

(71) Applicant: IVECO MAGIRUS AG, Ulm (DE)

(72) Inventors: Georg Leoka, Ulm (DE); Franz Baur, Achstetten (DE)

(73) Assignee: IVECO MAGIRUS AG, Ulm (DE)

( * ) Notice: Subject to any disclaimer, the term of this patent is extended or adjusted under 35 U.S.C. 154(b) by 0 days.

(21) Appl. No.: 14/766,783

(22) PCT Filed: Feb. 12, 2014

(86) PCT No.: PCT/EP2014/052744
§ 371 (c)(1),
(2) Date: Aug. 10, 2015

(87) PCT Pub. No.: WO2014/124979
PCT Pub. Date: Aug. 21, 2014

(65) Prior Publication Data
US 2015/0375720 A1   Dec. 31, 2015

(30) Foreign Application Priority Data

Feb. 12, 2013  (EP) .................................... 13154922

(51) Int. Cl.
*B60T 8/26*        (2006.01)
*B60T 13/66*      (2006.01)
(Continued)

(52) U.S. Cl.
CPC .......... *B60T 8/266* (2013.01); *B60T 8/1708* (2013.01); *B60T 8/1766* (2013.01); *B60T 13/662* (2013.01); *B60T 13/683* (2013.01)

(58) Field of Classification Search
CPC ...... B60T 13/683; B60T 15/027; B60T 8/327; B60T 8/4818; B60T 8/266
(Continued)

(56) References Cited

U.S. PATENT DOCUMENTS

| | | | | |
|---|---|---|---|---|
| 4,787,683 A | * | 11/1988 | Singleton | B60T 8/1708 303/127 |
| 5,251,968 A | * | 10/1993 | Rath | B60T 7/107 188/349 |

(Continued)

FOREIGN PATENT DOCUMENTS

| | | |
|---|---|---|
| DE | 3312980 | 10/1984 |
| DE | 4326256 | 12/1994 |

(Continued)

OTHER PUBLICATIONS

PCT International Search Report and Written Opinion dated Jul. 10, 2014 for PCT International Application No. PCT/EP2014/052744.
(Continued)

*Primary Examiner* — Bradley T King
*Assistant Examiner* — Mahbubur Rashid
(74) *Attorney, Agent, or Firm* — RMCK Law Group, PLC

(57) ABSTRACT

System for reducing the brake wear of heavy vehicles, in particular for public transportation or for garbage collection, the vehicle comprising a pneumatic braking system for the actuation of the brakes, the wear reducing system being characterized in comprising limiting means, suitable to be activated, for limiting the air pressure within the pneumatic braking system.

3 Claims, 1 Drawing Sheet

(51) Int. Cl.
*B60T 13/68* (2006.01)
*B60T 8/17* (2006.01)
*B60T 8/1766* (2006.01)

(58) Field of Classification Search
USPC .......................................................... 303/127
See application file for complete search history.

(56) References Cited

U.S. PATENT DOCUMENTS

| | | | | |
|---|---|---|---|---|
| 5,344,222 | A * | 9/1994 | Helldorfer | B60T 8/172 303/166 |
| 5,409,303 | A * | 4/1995 | Engelbert | B60T 8/1708 188/170 |
| 5,470,134 | A * | 11/1995 | Toepfer | B60T 8/1764 188/1.11 L |
| 5,632,535 | A * | 5/1997 | Luckevich | B60T 8/1766 188/349 |
| 5,752,747 | A * | 5/1998 | Decker | B60T 8/266 303/113.4 |
| 7,338,335 | B1 * | 3/2008 | Messano | B60G 13/14 180/65.22 |
| 2003/0038540 | A1 * | 2/2003 | Heller | B60T 15/185 303/127 |
| 2004/0145237 | A1 * | 7/2004 | Duchet | B60G 17/0523 303/127 |
| 2005/0275282 | A1 * | 12/2005 | McCann | B60T 13/66 303/127 |
| 2009/0198427 | A1 * | 8/2009 | Christopher Jackson | B60T 7/122 701/70 |
| 2012/0080935 | A1 * | 4/2012 | Steinberger | B60T 8/327 303/2 |
| 2013/0184957 | A1 * | 7/2013 | Herges | B60T 7/20 701/76 |

FOREIGN PATENT DOCUMENTS

| | | | | |
|---|---|---|---|---|
| EP | 0561050 | A1 * | 9/1993 | ............ B60T 8/1831 |
| EP | 0934859 | A1 * | 8/1999 | ............ B60T 8/266 |
| GB | 2266567 | | 11/1993 | |
| GB | 2266567 | A | 11/1993 | |
| RU | 2359846 | C2 | 6/2009 | |
| WO | 2005082675 | A1 | 9/2005 | |

OTHER PUBLICATIONS

Russian Office Action for Russian Application No. 2015138957/11(059753) dated Dec. 21, 2017 with Translation, 9 pages.

* cited by examiner

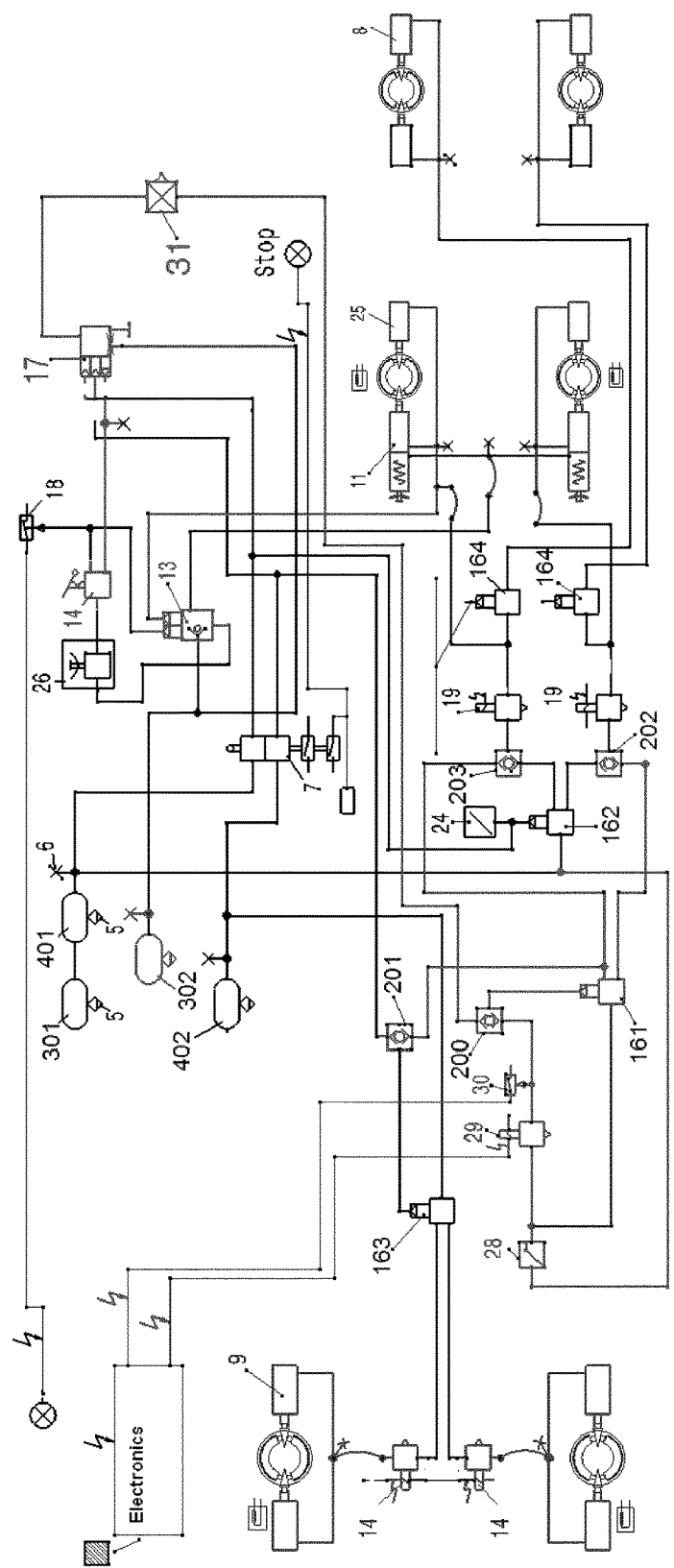

SYSTEM FOR REDUCING THE BRAKE WEAR OF HEAVY VEHICLES, IN PARTICULAR FOR PUBLIC TRANSPORTATION OR FOR GARBAGE COLLECTION

CROSS-REFERENCE TO RELATED APPLICATIONS

This application is a 371 U.S. National Stage of International Application No. PCT/EP2014/052744, filed Feb. 12, 2014, which claims priority to European Application No. 13154922.2 filed on Feb. 12, 2013. The disclosure of each of the above applications is incorporated herein by reference in their entirety.

FIELD OF THE INVENTION

The present invention relates to a system for reducing the brakes wear of heavy vehicles, in particular for the public transportation or for garbage collection.

DESCRIPTION OF THE PRIOR ART

The vehicles adapted for the public transportation are usually involved in frequent subsequent stops, spaced few hundreds of meters between each other.

Therefore, the vehicles brakes, especially the rear ones, are stressed.

The characteristics of the brake system is usually defined in view of the vehicle mass and in view of the highest speed that the vehicle is able to reach. In addition, the braking force is mainly distributed on the rear brakes, so as the components defining the rear brakes are subjected to a fast wear.

SUMMARY OF THE INVENTION

Therefore, the main object of the present invention is to provide a system for controlling vehicular brakes, in order to overcome the above problems/drawbacks arising when a heavy vehicle has to work in a high stressing stop-and-go condition.

The main principle of the invention is to provide a manually or automatically switchable command able to redistribute the pressure among the wheel axles in a different way.

According to the present invention, when a vehicle is designed for a urban public transportation or for those mission implying frequent braking procedures at low speed, it is provided with means for reducing the air pressure of the braking system by equally applying such reduced air pressure to all brake chambers (8), (9), (25) and brake spring actuators (11) respectively of the brake system.

According to the present invention, when such vehicle have to face an extra-urban path, implying higher vehicle speed, then the functioning of the braking system is restored, i.e. by restoring the original high air pressure from foot brake valve (7) and the original distribution of the braking force among the wheel brakes. Such restoring operation may be performed manually or automatically by the system.

Advantageously, being such heavy vehicles are employed for a considerable amount of time in low speed paths, the wear of the brakes is distributed among the front and rear axles. Being the vehicle speed limited, in the urban contests, to 30 or 50 km/h, according to the present invention, also the air pressure is reduced accounting for such speed limitation.

This limitation, do not reduce the safety of the vehicle, being the braking force made proportional to such limited vehicle speed.

According to a preferred embodiment of the present invention, such pressure and preferably such different redistribution of the braking force is automatically restored to the original characteristics, when the vehicle speed exceeds, for example, respectively the 40 and 60 km/h, for safety reasons.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing FIGURES, wherein FIG. 1 shows a pneumatic scheme implemented according to the present invention.

The same reference numerals and letters in the FIGURES designate the same or functionally equivalent parts.

DETAILED DESCRIPTION OF THE PREFERRED EMBODIMENTS

The public transportation vehicles have a braking systems, whose the air pressure is for example about 8.5 bar. This value is found on the base of the vehicle mass and on the base of the highest speed that the vehicle can rich.

In addition, such pressure, usually is mainly applied to the rear brakes.

According to the present invention, the air pressure can be limited to a lower predefined value calculated according to an urban use of the vehicle and such pressure, namely such braking force, is identically applied to the front and rear axles.

This leads to a lower front and rear brakes consumption, without compromise the braking efficiency of the vehicle.

According to the present invention, such reduction and redistribution of the braking force is restored when the vehicle is going to face an extra-urban path, where usually the vehicle speed can exceed the usually 30 or 50 km/h of the city contests.

According to a preferred embodiment of the present invention, when the vehicle speed exceeds a predefined threshold the system is automatically restored.

According to another embodiment of the present invention the system is provided of control means for activating and/or deactivating such pressure limitation, and preferably also an equally distribution of the braking force.

With reference to FIG. 1, the driver actuate in cabin the integrated switch of electronic brake system for above mentioned special application. It means, at every bus stop, all public buses brake even more often and a similar situation applies in the case of collection and disposal of garbage too.

According to a preferred embodiment of the present invention, the vehicle electronic system transmits an electric and/or digital signal—when the vehicle is provided of a CAN network—to the brake system's 3/2-way valve (29). This 3/2-way valve (29) permits the passage of compressed air of the pressure of 3.5 bar supplied by pressure-reducing valve (28), which is either located upstream of the 3/2-way valve (29) with respect to the compressed air source/air tanks (301,401). This compressed air reaches one of the two inputs of the two-way valve (200). The single output of the two-way valve is connected with the control input (161.4) of the relays valve (161), so as the limited compressed air is supplied at the pressure of 3,5 bar from the pressure-reducing valve (28) via a second two-way valve (201) through relays valve (163) and ABS valve (14) to the front brake chambers (9) and from the same relays valve (161) via a third and fourth two-way valves (202) and (203) through ABS valves (19) to the brake spring actuators (11) and to the brake chambers (25) and via relays valve (164) to the brake chambers (8) of the rear axles respectively.

The relays valve (161) is fitted between the output of the pressure-reducing valve (28) and these three two ways valves (201, 202 and 203).

The high quality brake systems offers excellent performance and value as well as for all standard application and for special application including in those vehicle subjected to frequent braking procedures, because of using of four two-ways valves (200,201,202,203). In a preferred embodiment of the invention the system includes two circuits one principal as on all known vehicles and a secondary circuit to reduce the wear including the already described valves 28, 29, 30, 31, 161, 200, 201, 202, 203. It means, that because of automatically transmitted electric signal from electronic system to 3/2-way (29) to actuate the brake system with 3.5 bar if the vehicle is driving or the driver let the car simply roll between 1 km/h and 2 km/h. This happens when the driver brake down the vehicle, but the vehicles coming to a halt from higher speed or the vehicle are driving uphill or downhill and the car may still roll away.

This new brake system minimize enormously effective the high wear as well as the brake shoes of drum brake or the pads of disc brake respectively on rear axle/s by using of pressure reducing valve (31) to distribute the compressed air from air tank (302) via anti-compounding relay valve (13) and shut-off 3/2 ways valve (26) actuating of hand brake valve (14) will be released the compressed air from trailer control valve (17) on front axle brake system and on rear axle brake system of vehicle the same pressure 4.0 bar to braking down the car from high speed if the driver actuate only the hand brake valve.

This obviously either on the front axle/s or on the rear axles.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A wear reducing system for reducing brake wear of brakes of a heavy vehicle, the heavy vehicle comprising a pneumatic braking system for actuation of the brakes via system air pressure where such air pressure is mainly distributed to rear brakes of the heavy vehicle, the wear reducing system including:
    limiting means for limiting the system air pressure within the pneumatic braking system to a limited air pressure lower than the system air pressure;
    wherein the limiting means comprises a pressure reducing valve in communication with a 3/2-way valve;
    wherein the wear reduction system further comprises an electronic control system in signal communication with the limiting means, said electronic control system configured for automatically activating said limiting means when a speed of said heavy vehicle falls under a first predefined speed threshold which is determined based on an urban driving path requiring frequent braking procedures at slow vehicle speeds, the activated limiting means applying the limited air pressure equally to front brakes of a front axle of the vehicle and the rear brakes of a rear axle of the vehicle; and
    wherein said electronic control system is further configured for automatically deactivating said limiting means and returning the limited air pressure to the system air pressure when the speed of the heavy vehicle exceeds a second predefined speed threshold, which is determined based on an extra-urban driving path which requires vehicle speeds greater than the first predefined threshold and does not require frequent stops.

2. The system according to claim 1, wherein the limited pressure within the pneumatic braking system is limited at 3.5 bar when the wear reduction system is active, and the system brake pressure is approximately 8.5 bar when the wear reduction system is deactivated.

3. The system according to claim 2, further comprising separate circuits for controlling actuation of the front brakes of the heavy vehicle and for actuation of the rear brakes of the heavy vehicle.

* * * * *